(12) United States Patent
Klein et al.

(10) Patent No.: US 6,228,028 B1
(45) Date of Patent: *May 8, 2001

(54) METHOD AND APPARATUS FOR ULTRASOUND IMAGE RECONSTRUCTION

(75) Inventors: Peter Klein, Danville, CA (US); Markus Marquart, Eching; Bernhard Mumm, Mammendorf, both of (DE)

(73) Assignee: Tomtec Imaging Systems GmbH, Unterschleissheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,430

(22) Filed: Nov. 7, 1997

(Under 37 CFR 1.47)

Related U.S. Application Data

(60) Provisional application No. 60/036,318, filed on Jan. 30, 1997, and provisional application No. 60/029,562, filed on Nov. 7, 1996.

(51) Int. Cl.[7] ................................................. A61B 8/00
(52) U.S. Cl. ............................................................. 600/437
(58) Field of Search ..................................... 600/437, 447, 600/443, 449; 128/916

(56) References Cited

U.S. PATENT DOCUMENTS

| | | | |
|---|---|---|---|
| Re. 30,397 | 9/1980 | King ........................ | 128/660 |
| 4,292,977 | 10/1981 | Krause et al. ............... | 128/712 |
| 4,341,120 | 7/1982 | Anderson ................... | 73/618 |
| 4,390,025 | 6/1983 | Takemura et al. ........... | 128/660 |
| 4,549,210 | 10/1985 | Dulapa ...................... | 358/112 |
| 4,562,540 | 12/1985 | Devaney .................... | 364/400 |
| 4,572,253 | 2/1986 | Farmer et al. .............. | 141/95 |
| 4,594,662 | 6/1986 | Devaney .................... | 364/400 |
| 4,598,366 | 7/1986 | Devaney .................... | 364/400 |
| 4,613,866 | 9/1986 | Blood ........................ | 343/448 |
| 4,747,411 | 5/1988 | Ledley ....................... | 128/660 |
| 4,821,731 | 4/1989 | Martnelli et al. ............ | 128/662.06 |
| 4,866,614 | 9/1989 | Tam .......................... | 364/413.25 |
| 4,932,414 | 6/1990 | Coleman et al. ............ | 128/660.09 |
| 5,081,993 | 1/1992 | Kitney et al. ............... | 128/661.08 |
| 5,105,819 | 4/1992 | Wollschlager et al. ....... | 128/662.06 |
| 5,148,810 | 9/1992 | Maslak et al. .............. | 128/661.01 |
| 5,152,294 | 10/1992 | Mochizuki et al. .......... | 128/662.03 |
| 5,159,931 | 11/1992 | Pini .......................... | 128/660.07 |
| 5,295,486 | 3/1994 | Wollschlager et al. ....... | 128/661.01 |
| 5,331,964 | 7/1994 | Trahey et al. ............... | 128/661.01 |
| 5,353,354 | 10/1994 | Keller et al. ................ | 382/6 |
| 5,361,768 | 11/1994 | Webler et al. .............. | 128/660.09 |
| 5,394,875 | 3/1995 | Lewis et al. ................ | 128/660.09 |
| 5,398,691 | 3/1995 | Martin et al. ............... | 128/662.06 |
| 5,460,181 | 10/1995 | Seyed-Bolorforosh ....... | 128/661.01 |
| 5,476,096 | 12/1995 | Olstad et al. ............... | 128/660.07 |
| 5,488,952 | 2/1996 | Schoolman .................. | 178/660.07 |
| 5,503,152 | 4/1996 | Oakley et al. .............. | 128/661.01 |

FOREIGN PATENT DOCUMENTS

| | | |
|---|---|---|
| 0 158 920 | 4/1985 | (EP) . |
| 0 487 339 A1 | 11/1991 | (EP) . |
| 0 736 284 A2 | 9/1996 | (EP) . |
| WO 91/03792 | 3/1991 | (WO) . |
| WO 96/00402 | 1/1996 | (WO) . |

*Primary Examiner*—Brian L. Casler
*Assistant Examiner*—Maulin Patel
(74) *Attorney, Agent, or Firm*—Sheridan Ross P.C.

(57) ABSTRACT

The ultrasound imaging system and method of the present invention defines the gray-scale value and other parameters for each of a plurality of image elements in an output volume by determining all of the image information in the scanning planes that is contained within a defined portion of the output volume (which contains the image element) and thereafter simultaneously analyzing the selected image information. These steps are repeated for each of the image elements in the output volume.

30 Claims, 13 Drawing Sheets

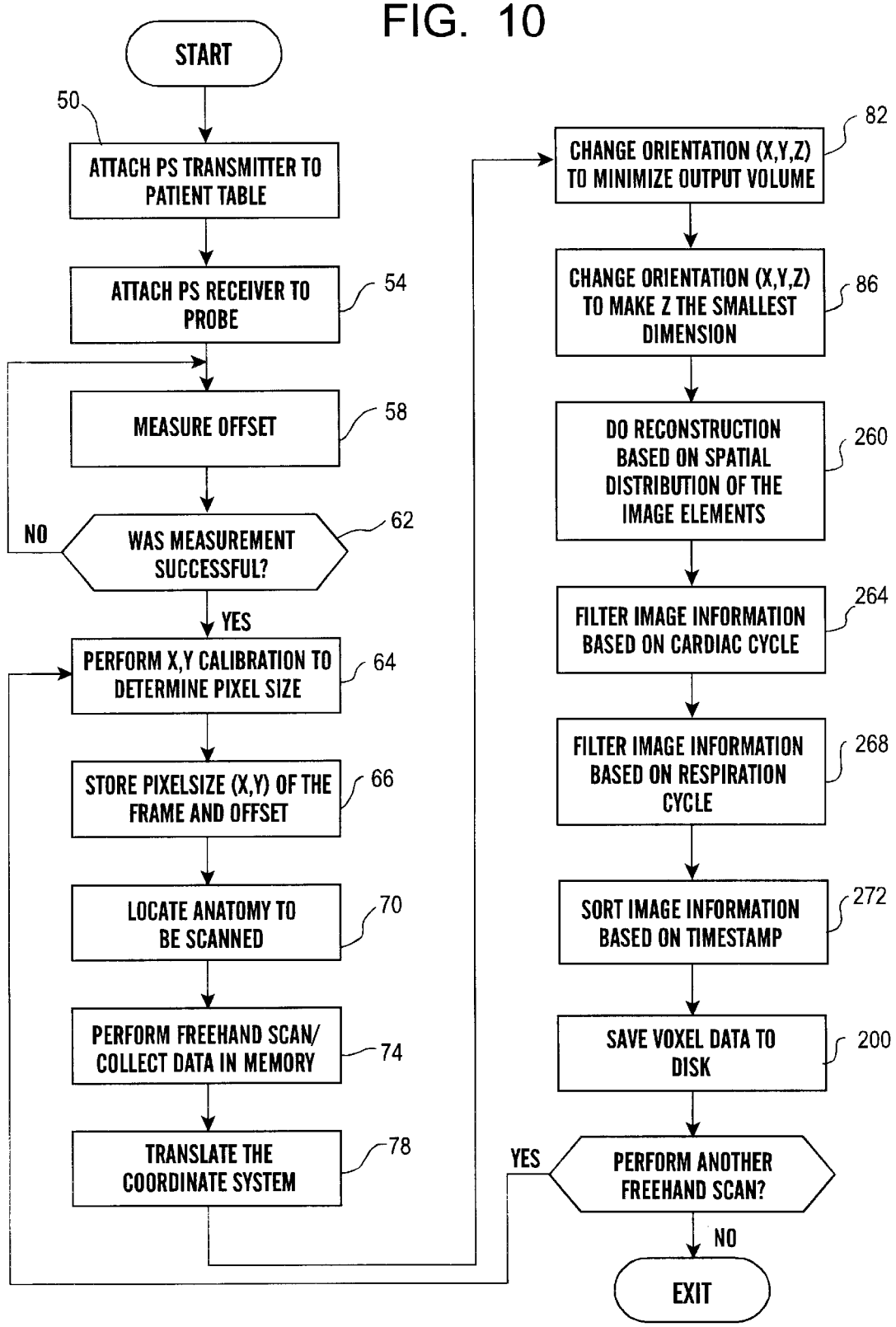

METHOD AND APPARATUS FOR ULTRASOUND IMAGE RECONSTRUCTION

This application claims priority under 35 U.S.C. §119(e) from U.S. Provisional Patent Application No. 60/029,562, filed on Nov. 7, 1996, and U.S. Provisional Application No. 60/036,318, filed on Jan. 30, 1997, both of which are incorporated herein by this reference.

FIELD OF THE INVENTION

The present invention relates to a method and apparatus for image reconstruction and particularly to a method and apparatus for three- and four-dimensional image reconstruction.

BACKGROUND OF THE INVENTION

Ultrasound imaging is becoming increasingly popular as a replacement for X-ray imaging techniques due to the health hazards associated with x-ray radiation. In ultrasound imaging, one or more emitting piezoelectric transducers are placed into contact with the patient's skin and energized to generate one or more ultrasound signals. The ultrasound signals are reflected by changes in tissue density, such as by the organ of interest, and the reflected signals received by one or more receiving piezoelectric transducers. The collected data, namely the time (measured from the time of signal emission) required by the signal to be received by the receiving piezoelectric transducer(s) and the intensity of the received signal, can be combined with the position (x,y,z) and orientation (alpha, beta, gamma) of the probe to generate a plurality of two-dimensional scanning or imaging planes. To form a three-dimensional image of the organ, an output volume containing a number of elements is generated. A gray-scale value is assigned to each element by sequentially and independently processing each of the scanning planes.

In designing an efficient three-dimensional ultrasound imaging system, there are a number of considerations. First, image data should not be ignored during generation of the output volume. The quality of the image can be negatively impacted by the failure to consider image data in the scanning planes. Second, the processing of the image data in all of the scanning planes should be performed quickly and with the least amount of memory space. Third, the user should have the option of utilizing a number of different algorithms to process the image data in the scanning planes. This flexibility permits the user to select the algorithm producing the highest quality image.

SUMMARY OF THE INVENTION

These and other design objectives are realized by the ultrasound imaging method of the present invention. The method can construct three- or four-dimensional image of an object, such as an organ (e.g., for medical diagnosis) or a machine part (e.g., for defect identification). The system includes at least the following steps:

(a) generating a plurality of image (or scanning) planes, each image plane containing image information describing an object; and (b) determining the image information in each of the plurality of image planes that is within a defined portion of an output volume to define a first subset of image information corresponding to the defined portion. The defined portion of the output volume can be an image element of any number of dimensions, such as pixels (i.e., two-dimensional image elements), voxels (i.e., three-dimensional image elements) or toxels (i.e., four-dimensional image elements).

As noted, the generating step is commonly performed by manually passing an ultrasound probe over the object or by electronically pulsing differing piezoelectric transducers in a transducer array. The position of the ultrasound probe is typically determined by a position sensor attached to the ultrasound probe.

The spatial offset(x, y, z, , β, γ) offset between the the position sensor or the used probe and the ultrasound-beam generating piezoelectric transducer in the transducer array must be determined. This offset can be determined by utilizing different methods. By way of example, a measurement with a three-dimensional ultrasound phantom can be performed. The offset can be determined by measuring defined landmarks in phantom images acquired from different directions.

The output volume generally includes a plurality of defined portions. The determining step is therefore repeated for each of the plurality of defined portions to define a subset of image information corresponding to each of the plurality of defined portions.

The image information typically includes location coordinates (i.e., x,y,z) relative to a reference axis, an angular orientation of the probe (alpha, beta, gamma) and gray scale value. As used herein, "gray scale value" refers to the gray scale value with or without color information, tissue doppler imaging information, or any other parameter describing the appearance of the object. The output volume is typically defined by three orthogonal reference axes. In the determining step, the image information that is located within the defined portion or that is within a selected distance of the defined portion is identified to define the first subset of image information.

The first subset of image information can be analyzed to define a second set of image information that is derived from the first subset of image information. The second subset of image information is different from the first subset of image information. The analysis can be performed using any known interpolation algorithms, including the first found algorithm, the closest distance algorithm, the weighted average algorithm, and the last found algorithm. A gray scale value is thereby assigned to the defined portion of the output volume. The gray scale value is related to a plurality of gray scale values in the first subset of image information.

There are a number of benefits associated with the imaging method of sorting through all of the image information. The gray scale value for a voxel or toxel in the output volume (or tolume) is determined by using all of the corresponding image information in the input volume. By way of example, image information is not ignored during generation of the output volume. The quality of the image is therefore relatively high. The simultaneous processing of selected image information in all of the scanning planes can also be performed quickly and with the least amount of memory space. Finally, the user has the option of utilizing a number of different algorithms to process the image data in the scanning planes. This flexibility permits the user to select the algorithm producing the highest quality image.

The present invention further includes an ultrasound imaging system for constructing three- or four-dimensional images describing an object. The system preferably includes:

(a) generating means for generating a plurality of image planes, with each image plane containing image information describing the object; and (b) determining means (e.g., a processor) for determining the image information in each of the plurality of image planes that is within a defined portion of the output volume to define a first subset of image information corresponding to the defined portion in the output volume. The generating means is in communication with the determining means to permit image construction.

The generating means can be any suitable image data acquisition device, such as an ultrasound probe connected to an ultrasound system. A position sensor receiver can be attached to the ultrasound probe to determine the position of the ultrasound probe. By way of example, this can be achieved by an electromagnetic position sensing system. The generating means can further include a calibration to determine a pixel size of a plurality of pixels in each image plane.

The system can further include analyzing means (e.g., a processor) for analyzing the first subset of image information to define a second set of image information that is derived from the first subset of image information. The second subset of image information is different from the first subset of image information. The analyzing means can assign a gray scale value to the defined portion of the output volume. The gray scale value is preferably related to a plurality of gray scale values in a first set of image information.

In a further embodiment of the present invention, a method is provided for constructing a three- or four-dimensional image describing tissue of a patient using temporal information. The method includes the steps of:

(a) generating image information describing the tissue and corresponding to a plurality of image planes, wherein the image information comprises a time stamp (e.g., a time at which the image information was generated). This time stamp can be an absolute time stamp and/or relative time stamp generated at a defined event. By way of example, such an event can be a defined phase in the cardiac cycle (e.g., measured with an ECG) and/or respiratory cycle of a patient;

(b) during the generating step, monitoring at least one of the cardiac and/or respiratory cycles of the patient to provide a set of temporal signals;

(c) filtering the image information based on the relationship of the image information to the temporal signals; and (d) thereafter generating an image of the tissue.

The monitoring step can include a number of substeps. In the case of cardiac cycles, a plurality of cardiac signals (a type of temporal signal) are generated based on sampling of an ECG signal and thereafter converted into digital values. Each of the digital values is then compared to a threshhold value to identify cycles of contraction and relaxation of heart muscles. In the case of respiratory cycles, a plurality of respiratory signals (another type of temporal signal) are generated and converted into digital values. As in the case of cardiac signals, each of the digital values is then compared to a threshhold value to identify cycles of contraction and relaxation of diaphragm muscles.

In the filtering step, the time intervals between cycles of contraction and relaxation of the heart or diaphragm muscles are determined and used in the selection of an optimal time interval. The time stamps for each item of image information are individually compared to the selected time interval. If the time stamps for a given item of image information fall within the time interval, the item is considered in generating the image of the tissue. If not, the item is not considered in generating the image. Another way of using the time stamps is to generate a continuous stream of images together with the time stamps. The image information is then filtered or sorted retrospectively after the acquisition according to the time stamps.

In cardiac applications, after the filtering step the various image elements in the output volume can be sorted based upon time stamp to provide images of the heart at selected points during a cardiac cycle or at the selected point during a number of cardiac cycles.

BRIEF DESCRIPTION OF THE DRAWINGS

FIG. 10 is a flow schematic of another embodiment of the present invention;

DETAILED DESCRIPTION

Figure 1:
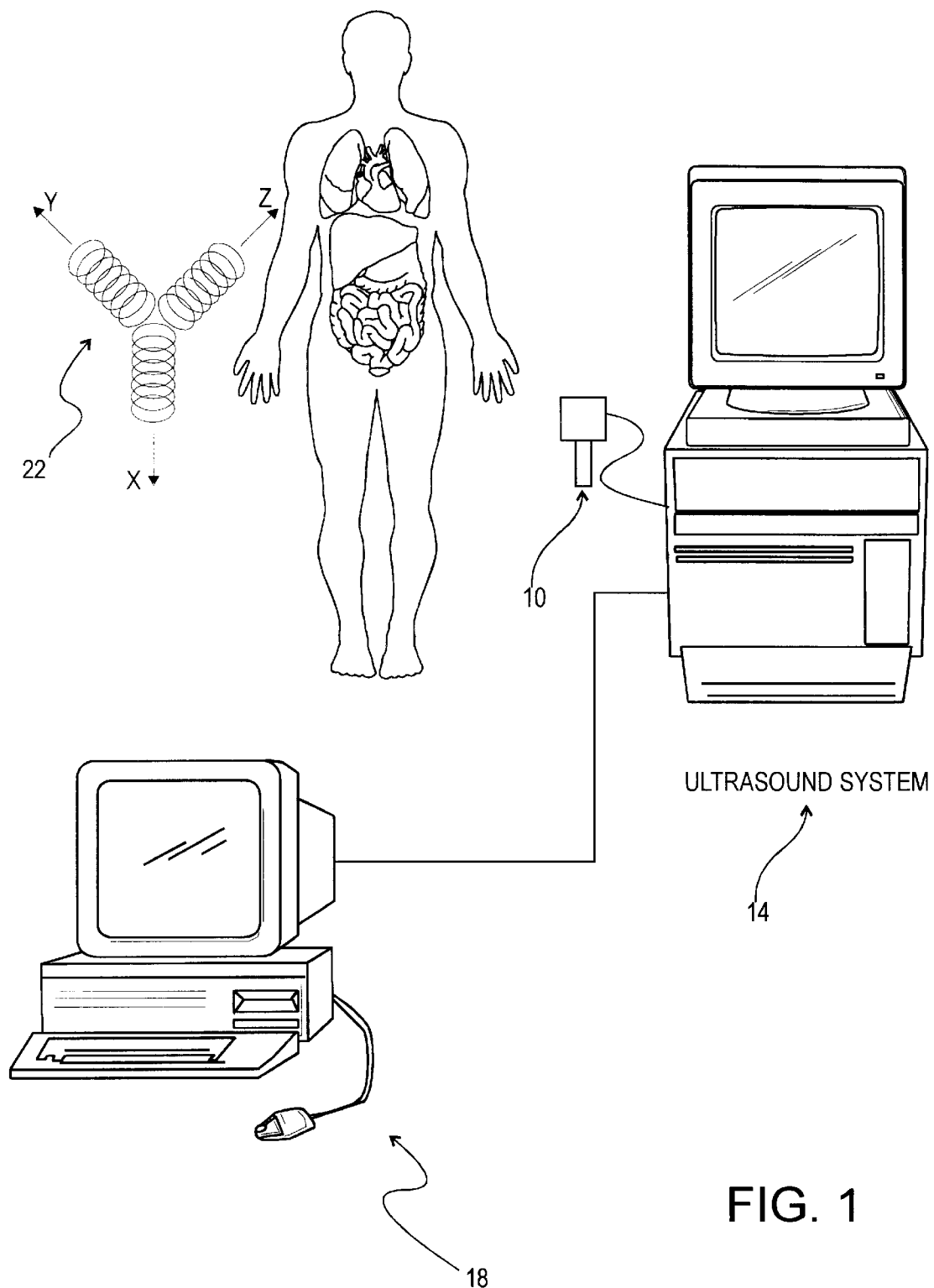
FIG. 1 depicts the ultrasound image system and the computer for image reconstruction.

The present invention provides a method and apparatus for image generation and reconstruction that is particularly useful in ultrasound applications. The method preferably includes the steps of: (i) generating a plurality of scanning planes containing image information together with spatial and/or temporal information of an object; (ii) providing an output volume for image reconstruction containing a plurality of image elements (e.g., image elements of any number of dimensions, such as pixels, voxels or toxels); and (iii) determining the image information in each of the plurality of scanning planes that is within a selected distance of a selected image element in the output volume or is contained within the selected image element itself. The image information falling within the selected distance of the selected image element or contained within the selected image element itself (referred to as "defined portion of the output volume") can be stored in the database and analyzed by any number of techniques at a later time. By way of example where image information from numerous scanning planes falls within the selected distance or is contained within the image element (i.e., the image information for a given image element contains a plurality of x's, y's, z's, alphas, betas, gammas, and/or other parameters (such as gray-scale value in ultrasound applications)), the image information can be analyzed by various estimation methods, such as first found, last found, closest distance, weighted average, and the like, to filter the image information as the resulting gray scale value in the output element. The above steps are repeated sequentially image element by image element in the output volume until all of the image elements in the volume contain image information.

The method is particularly useful for generating three- and four-dimensional images from two-dimensional image information. In ultrasound applications, for example, the scanning planes are segmented into a plurality of pixels (i.e., two dimensional elements) with each pixel containing image information. The scanning planes include information about the position (x, y, and z) and orientation (alpha, beta, and gamma) of the ultrasound probe in space as a function of time. The image data set for each voxel or toxel includes information regarding voxel or toxel position and the gray-scale value. As will be appreciated, the scanning planes can be substantially parallel to one another, such as where the probe is mounted on a carriage device, or rotated to one another, such as where the probe rotates around a fixed axis (e.g., around any one of the x, y, or z axes) or is arbitrarily moved where the probe is located by a suitable tracking system.

This technique permits the reconstruction of a more accurate image based on image information. The technique does not discard image information for each voxel but can have all the image information within the specified distance of a portion of the voxel and permit the user to perform a neighborhood analysis by any one of a number of techniques selected by the user. The user therefore has flexibility in selecting the analytical technique providing the most accurate image in a given application.

In another embodiment, the output volume is generated using spatial and temporal image information. The appropriate image information to be included in each image element is thus determined for each of the plurality of scanning planes by selecting image information that is within a selected distance of the element or is contained within the selected image element itself and/or within a selected time interval of a selected reference point. By way of example, the ultrasonic imaging system can "time stamp" the scan yielding image information. The time stamp indicates the time of the scan and therefore the acquisition of the image information (other than the time stamp) relative to a selected reference point. The time stamp can be measured relative to the initiation of image acquisition sequence (i.e., absolute time stamp), relative to the nearest cardiac cycle (or r wave) (i.e., time stamp relative to r-wave), relative to the nearest respiratory cycle (i.e., time stamp relative to respiratory cycle), or relative to another selected temporal reference point. The use of time stamps permits sorting of the image elements to be performed based on spatial information and/or temporal information as desired. The time stamp advantageously permits a user to perform freehand data acquisition for applications involving moving organs, such as the heart, and to perform image construction at selected points of time during organ movement.

In yet another embodiment, the image information includes the one-dimensional ultrasound beam data instead of the two-dimensional ultrasound images commonly used in image reconstruction. Ultrasound beam data is the ultrasound information along a one-dimensional ultrasound beam or ray (which are typically generated by a single piezoelectric element or an array of piezoelectric elements) resulting from reflection of the beam or ray by tissue or body structures. For example, ultrasound beam data includes "raw" RF beam data, demodulated beam data, and any signal along the beam derived from the "raw" RF data. A two-dimensional ultrasound image generally is formed by data produced by a plurality of ultrasound beams. By using ultrasound beam data as image information and not two-dimensional ultrasound images, the present invention can produce three- and four-dimensional images that are more accurate than those produced using the two-dimensional images alone. As will be appreciated, in converting the ultrasound beam data into two-dimensional images prior to three- or four-dimensional image reconstruction valuable data can be discarded. The present invention overcomes this problem by converting the beam data directly into the three- and four-dimensional images and not using the intermediate two-dimensional images.

Figure 4:
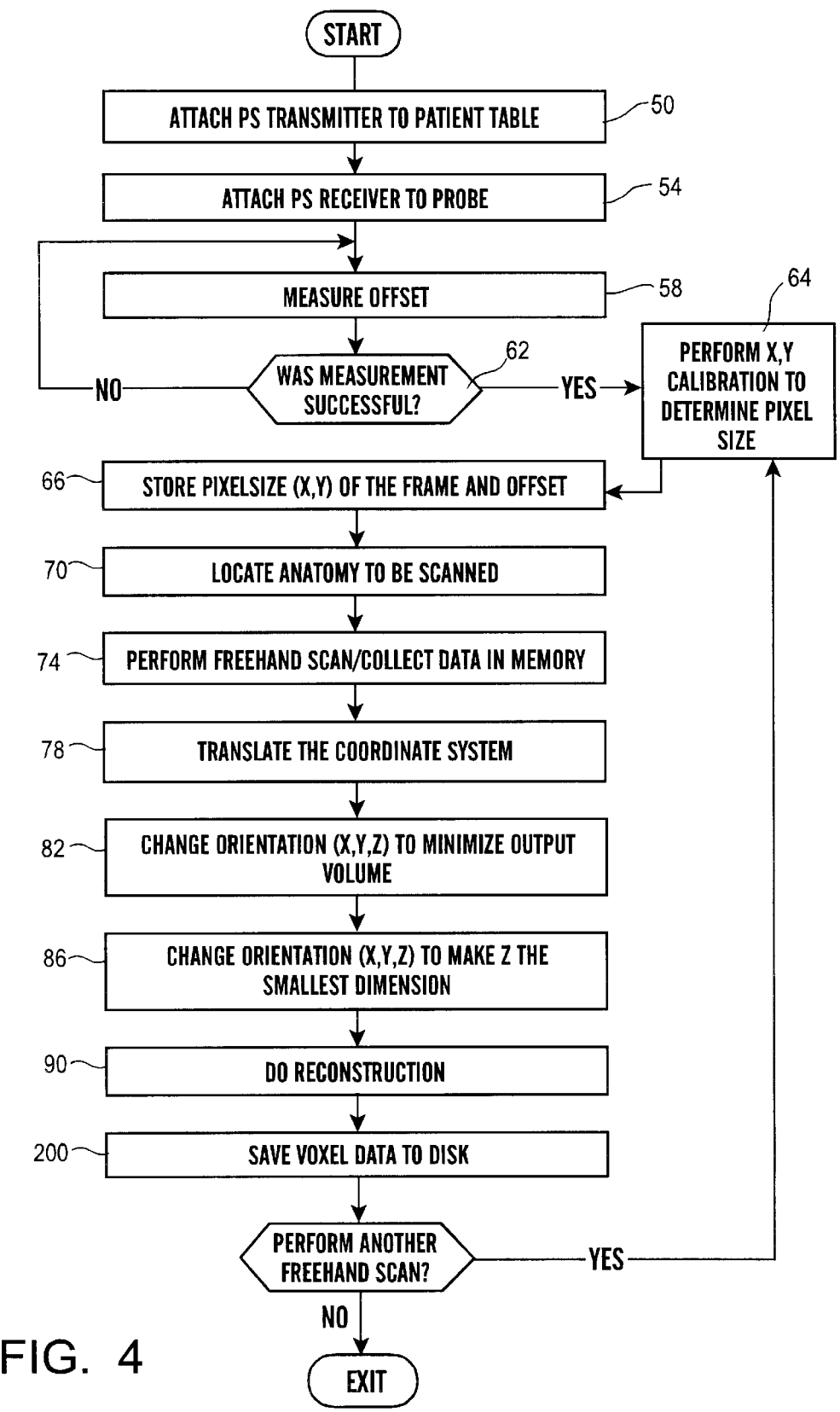
FIG. 4 is a flow schematic depicting the image acquisition and reconstruction steps.

Referring to FIG. 4, the steps for generating a three-dimensional image of a scanned object according to the present invention are illustrated. Referring to FIGS. 1 and 4 in action boxes 50 and 54, the user, in one embodiment of the invention, attaches a transmitter 22 of a position sensing system to the patient's table to provide a two- or three-dimensional electromagnetic "grid" (formed by overlapping electromagnetic fields) and a position sensor receiver to the ultrasound imaging probe 10 connected to the ultrasound system 14 to record the position and orientation of the probe 10 in the electromagnetic grid during image acquisition as a function of time. As will be appreciated, other suitable grid systems can be used for probe tracking, such as an infrared grid system. Alternatively, any other suitable probe can be employed including a probe carriage device such as that disclosed in U.S. Pat. Nos. 5,295,486 and 5,105,819 (which are incorporated herein by reference) or a fixed probe such as that disclosed in U.S. Pat. No. 5,159,931 (which is incorporated herein by reference).

In action boxes 58, 64 and 66 and decision box 62, a measurement is performed with a calibration phantom to determine the precise position of the sensor on the probe and the (x,y,z, , β, γ) offset and an image calibration is thereafter generated to determine the pixel size (x and y) of the frame. The calibration phantom informs the central processor in the computer 18 of the offset in space and orientation contained within a specified amount of probe displacement. If the measurement is not successful, action box 58 is repeated. If the measurement is successful, in action box 66 the pixel size (x and y) of the frame and offset are stored in the memory of the computer 18.

Figure 2:
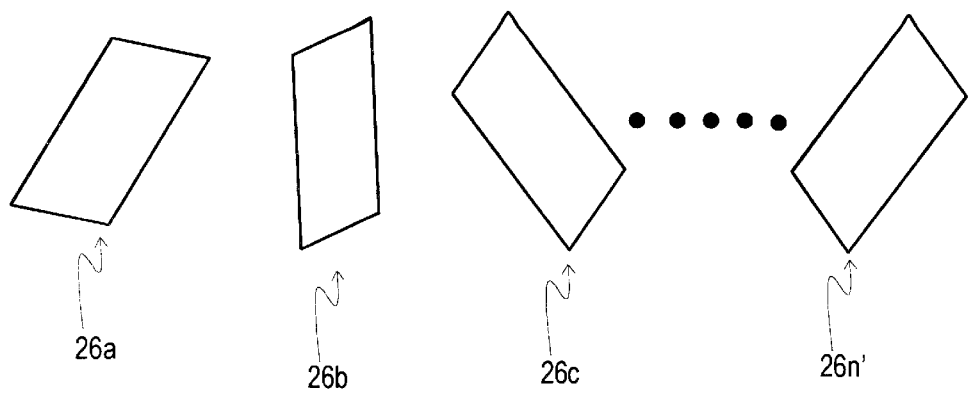
FIG. 2 depicts the assorted scanning planes produced during image acquisition.

In action boxes 70–74, the scanning or image information acquisition is performed. After location of the object or anatomy to be scanned in action box 70, freehand scanning, or another suitable scanning technique, is performed by placing the probe over the object and moving the probe relative to the object or by pulsing different transducers in a transducer array. In freehand scanning, the user moves the probe over the object and can translate, rotate, and tilt the probe by an arbitrary amount in any arbitrary direction at any time. As shown in FIG. 2, the position (x, y, and z) and orientation (alpha, beta, and gamma) of the probe over time is recorded by the position sensor receiver attached to the corresponding scanning plane 26a–n'. As will be appreciated, to define a plane in space a point (x, y, and z) on the plane and the orientation (alpha, beta, and gamma) of the plane are required. The user terminates acquisition when n' scanning planes have been acquired with n' being a sufficient number of scanning planes to permit reconstruction of an image of the scanned object. The image information includes raw images that represent the ultrasound reflection for a number of specific scanning planes in the object. The image information for each of the scanning planes 26a–n' are digitally stored together with all corresponding spatial and temporal coordinates and directions in the computer memory.

In action box 78, the coordinate system used during image acquisition is translated or shifted to the upper left of every scanning plane. This is done by calibrating the raw image(s) in each scanning plane, translating from the sensor coordinate system which originates in the sensor receiver to the upper left of every scanning plane, and setting the resolution in all dimensions of the output image to the minimal resolution of the raw image dimensions. Using the stored values of the earlier measurement with the calibration phantom, the raw images are calibrated by defining the resolution of x and y corresponding to image width and image height (measured in millimeter per pixel) of the object. To translate the sensor coordinate system, the following equation is employed for x, y and z:

$$X'=Tb+Rb*Ri(Ti+X)$$

where Tb=the translation of the position sensor, Rb=the rotation matrix calculated from position sensor angles, Ri=the matrix describing the tilting of the image plane relative to the plane defined by the receiver of the position sensor, and Ti=the translation of the upper left of the scanning plane relative to the position transmitter location. As will be appreciated, the equation can be used for y by substituting "y" for "x" and for z by substituting "z" for "x". The resolution in all of the volume dimensions is set to the minimal resolution of raw image dimensions. In other words, the appropriate number of pixels is determined that correspond to each millimeter of the output volume in the x, y, and z directions.

In action box 82, the orientation of the coordinate system (x, y, and z) is changed so that the output volume is substantially minimized. This step minimizes the risk of exceeding the memory capacity of the computer 18 by making the volume too large. Accordingly, the orientation of the coordinate system is set to enable the volume to contain the various scanning planes using the least amount of memory capacity.

In action box 86, the orientation (x, y, and z) is changed again to make the "z" dimension the smallest dimension. Thus, the z axis is oriented such that the smallest dimension of the scanned object lies along the z axis.

Figure 3:
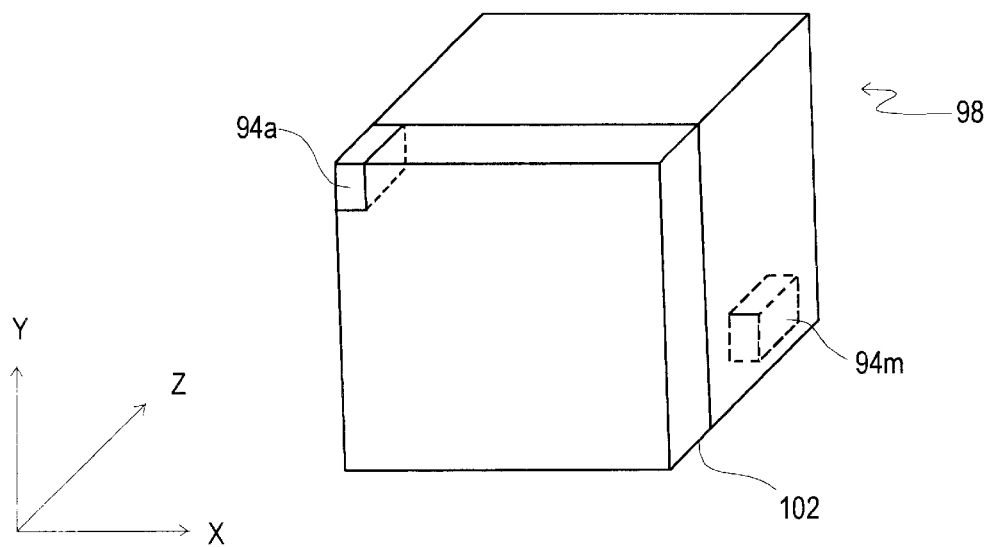
FIG. 3 depicts the output volume and an image element in the output volume.

Referring to FIGS. 3 and 4, in action box 90, image information in each of the scanning planes that is within the selected distance of a portion of each and every image element 94a–m in the output volume 98 (e.g., voxel cube) is determined. The goal of volumetric reconstruction is the transformation of the image information corresponding to each pixel of the various scanning planes 26a–n' to a three-dimensional orthogonal coordinate system. Thus, the collection of raw images of dimension Xin and Yin in the scanning planes 26a–n' is transformed into an output volume 98 having dimensions x, y, and z. An output image 102 is one slice of the output volume 98. Output volume dimensions in x and y correspond to image width and image height. Output volume dimension z is described by a vector that is substantially normal to an output frame.

The reconstruction algorithm iterates sequentially through each image element in the output volume and estimates the gray-scale value from the image information in all of the scanning planes that is contained within or is within the selected distance of the image element. Thus, the output volume is "empty" of image information before application of the reconstruction algorithm and is sequentially filled image element by image element by the algorithm. In contrast, existing reconstruction algorithms sequentially fill the output volume with image information contained within the scanning planes. This is done on a scanning plane-by-scanning plane basis rather than on an image element-by-image element basis.

The reconstruction algorithm of the present invention can be performed mathematically for each image element in the output volume by reviewing for each image element all of the scanning planes and identifying for the selected image element the scanning planes which intersect with a sphere of radius "R" centered at the image element of interest. As will be appreciated, the sphere can be replaced by a rectangle or another suitable geometrical shape.

Figure 8:
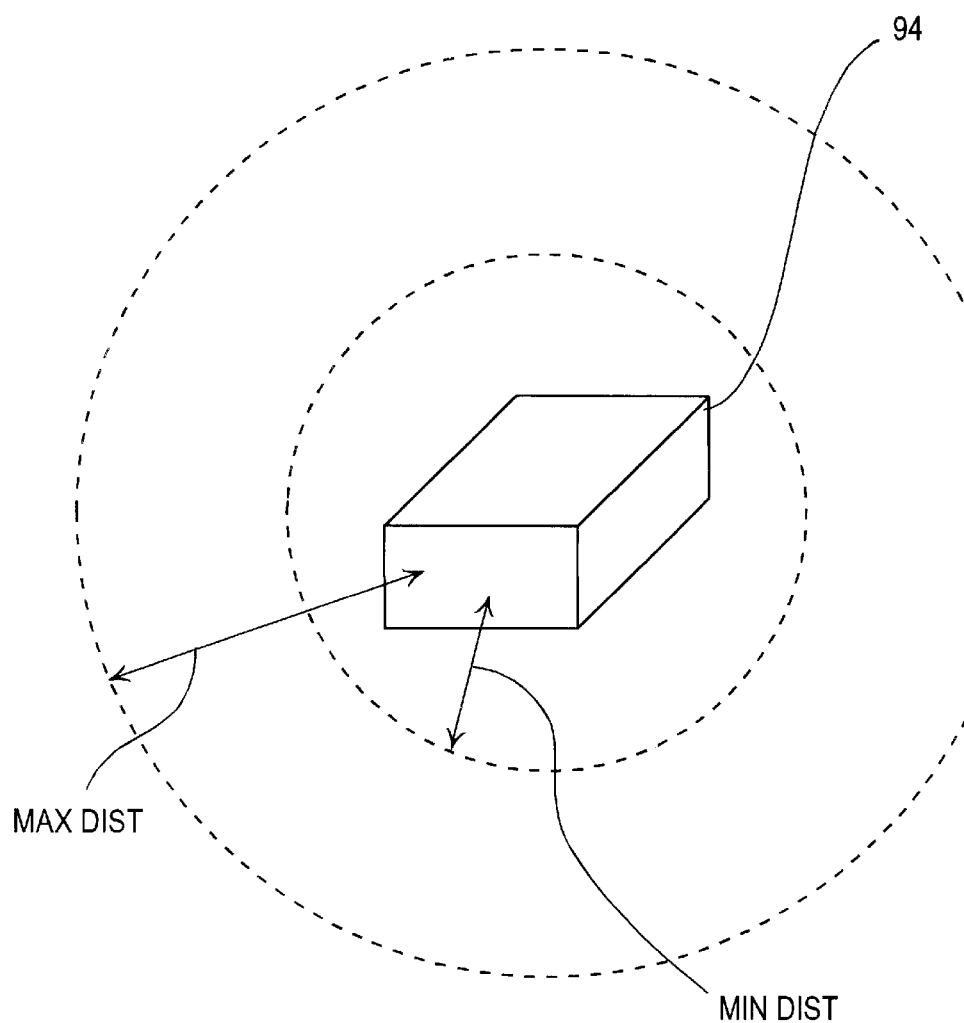
FIG. 8 represents MinDist and MaxDist relative to an image element of interest.

In each of the iterations, "R" is determined based on MinDist and MaxDist values. As shown in FIG. 8, MinDist and MaxDist values represent two discrete spatial distances between the output image element and the input image element. More specifically, MinDist and MaxDist are distances in space given by x,y and z coordinates related to the image element of interest 96. MinDist and MaxDist are values used as distance thresholds for "R" in the reconstruction algorithm. MinDist and MaxDist settings depend on the pixel size of an individual data set which are derived from the image calibration. Thus, pixel sizes are identical for all frames of a data set. MinDist and MaxDist are computed according to the following equations:

$$\text{MinDist=Input pixel size }[x];$$

and $$\text{MaxDist=6*input pixel size }[x].$$

By way of example, if the pixel sizes of the acquired frames through image calibration are 0.50 mm per pixel for the x dimension (horizontal) and 0.34 mm per pixel for the y dimension (vertical), MinDist is set at 0.5 mm and MaxDist is set at 6*0.5=3 mm.

The difference, MaxDist−MinDist, is divided into n−1 steps to yield DeltaDist, with n representing the number of iteration loops in the reconstruction algorithm. Preferably, n is set at 4. Thus, DeltaDist is defined by the following equation:

$$\text{DeltaDist=(MaxDist−MinDist)}/(n-1)$$

Using the value of DeltaDist, the value for "R" is determined by one of the following equations, depending upon the iteration:

| R | Iteration No. | Equation |
|---|---|---|
| $R_1$ | 1 | MinDist |
| $R_2$ | 2 | MinDist + (DeltaDist * 1) |
| $R_3$ | 3 | MinDist + (DeltaDist * 2) |
| $R_4$ | 4 | MinDist + (DeltaDist * 3) |

After all of image information in the neighborhood of each image element 94a–m in the output volume 98 (where m is the number of image elements in the output volume) is determined by the above-noted neighbor analysis or when the neighbor analysis is being performed on an image element-by-image element basis, any number of analytical techniques can be employed in action box 90 to assign a particular gray-scale value or other parameter to each image element. Such techniques include, for example, a first found algorithm, a closest distance algorithm, a weighted average algorithm, and a last found algorithm.

Figure 5:
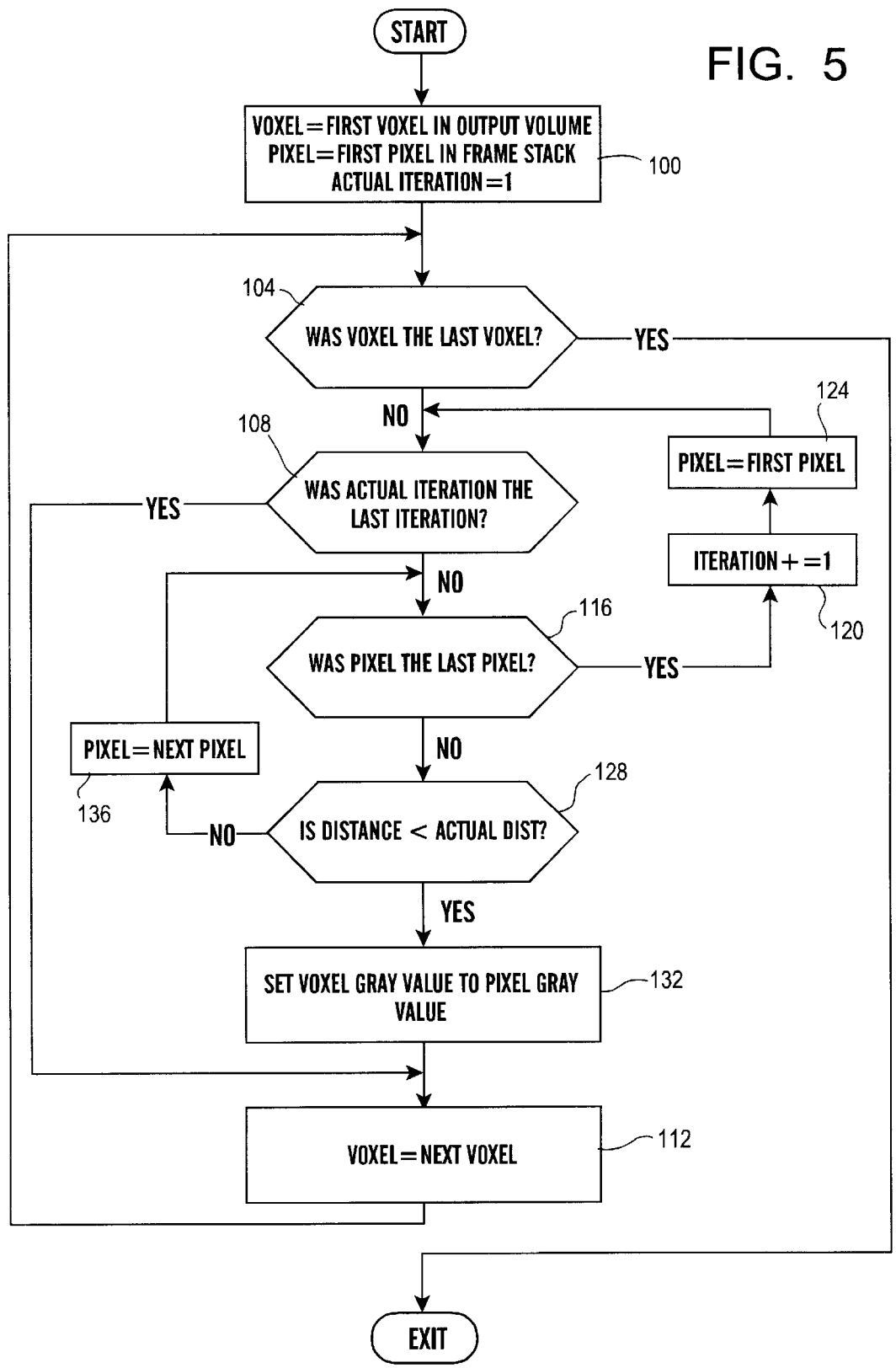
FIGS. 5–7 depict various flow schematics for different algorithms that can be used during image reconstruction to determine gray-scale value for an image element.

FIG. 5 is a flow schematic of the first found algorithm being used at the same time as the neighbor analysis technique noted above. At most n iterations are performed. In the first iteration, the first input pixel gray-scale value that is found and that is closer to a portion of the image element 94 than the MinDist is taken as the actual gray-scale value for the particular image element 94. If no such pixel is found, MinDist is set to MinDist+DeltaDist and the operation is repeated. If no pixel is found after n repetitive operations, the pixel value is left undefined.

Referring to FIG. 5 in action box 100, the first image element 94*a* in the output volume 98 is selected and the first pixel in the first scanning plane in a frame stack. The frame stack is simply the collection of all of the scanning planes 26*a–n'*. In decision box 104, the central processor determines if the image element 94*a* is the last image element in the output volume 98. If so, the central processor exits the algorithm. If not, the central processor continues to decision box 108, where it determines whether the actual iteration is the last iteration "n". If so, the central processor continues to action box 112. If not, the central processor continues to decision box 116 where it determines if the pixel under consideration is the last pixel in the frame stack. If so, the central processor continues to action boxes 120 and 124 where it increases the iteration number by "1", and the pixel number to the first pixel and returns to decision box 104. If not, the central processor continues to decision box 128, where it determines if the distance from the center of the image element 94*a* to the pixel in the scanning plane 26*a–n* of interest is less than the selected radius (i.e., MinDist). If so, the central processor continues to action box 132 where it sets the gray-scale value for the image element 94*a* equal to the pixel gray-scale value. If not, the central processor continues to action box 136 where it selects the next pixel and returns to action box 108. In action box 112, the steps are repeated for the next (typically adjacent) image element in the output volume.

Figure 6:
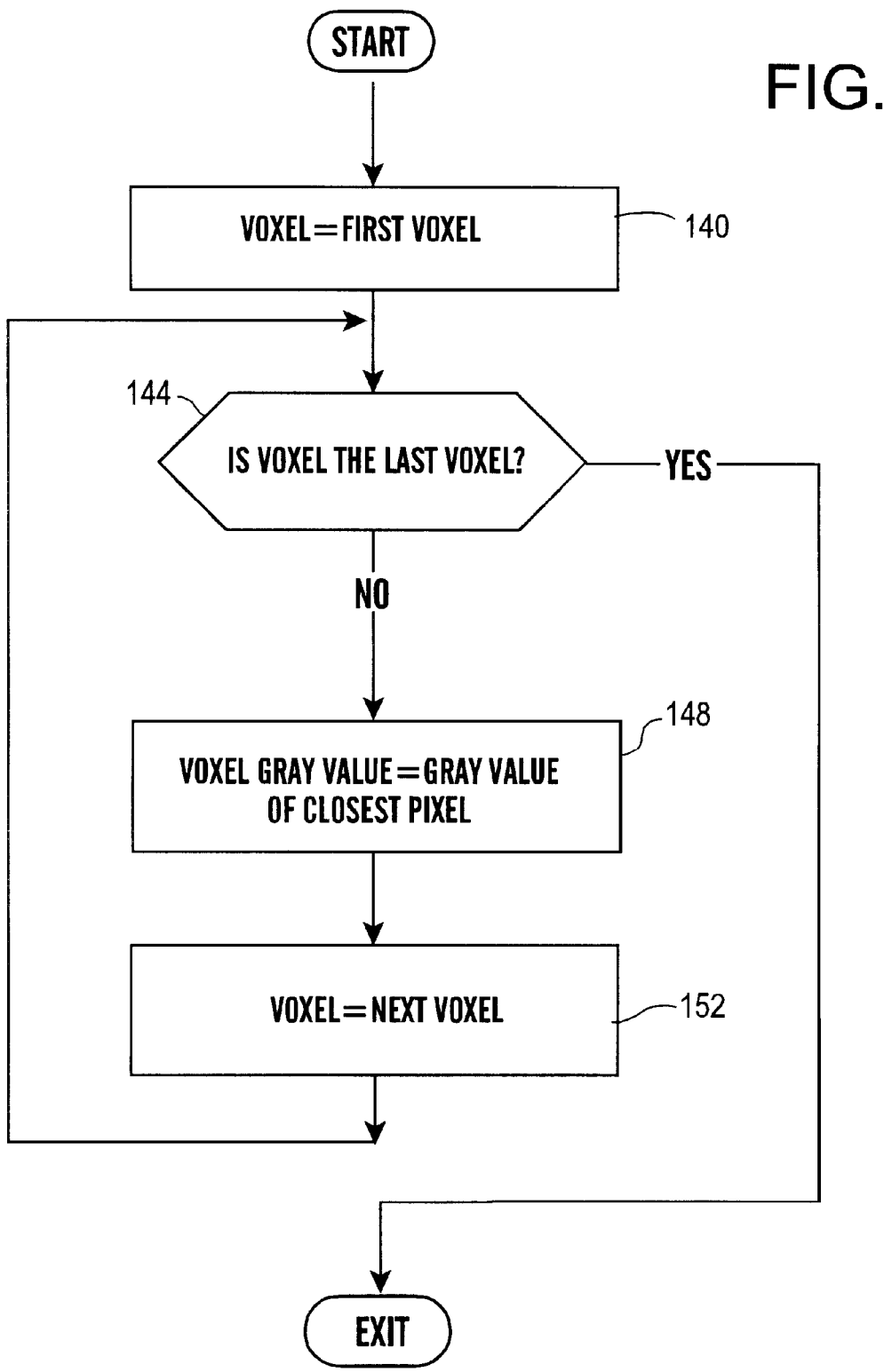

Referring to FIG. 6, the closest distance algorithm is depicted. In the algorithm, the gray-scale value of the pixel of the scanning planes 26*a–n'* that is closest to the image element 94*a–m* and that is closer than MinDist is taken as the gray-scale value of the image element 94*a–m*. In action box 140, the central processor selects the first image element 94*a*. In decision box 144, the central processor determines if the image element is the last image element. If so, the central processor exits the algorithm. If not, the central processor continues to action box 148 where it sets the gray-scale value of the image element 94*a* equal to the gray-scale value of the closest pixel in the various scanning planes 26*a–n'* to the image element 94*a*. If the closest pixels are equidistant from the image element, suitable mathematical techniques can be used to select the gray-scale value, including weighted average techniques. In action box 152, the central processor repeats the preceding steps for the next image element 94*b* in the output volume 98 and so on until the steps are performed for image element 94*m*.

Figure 7:
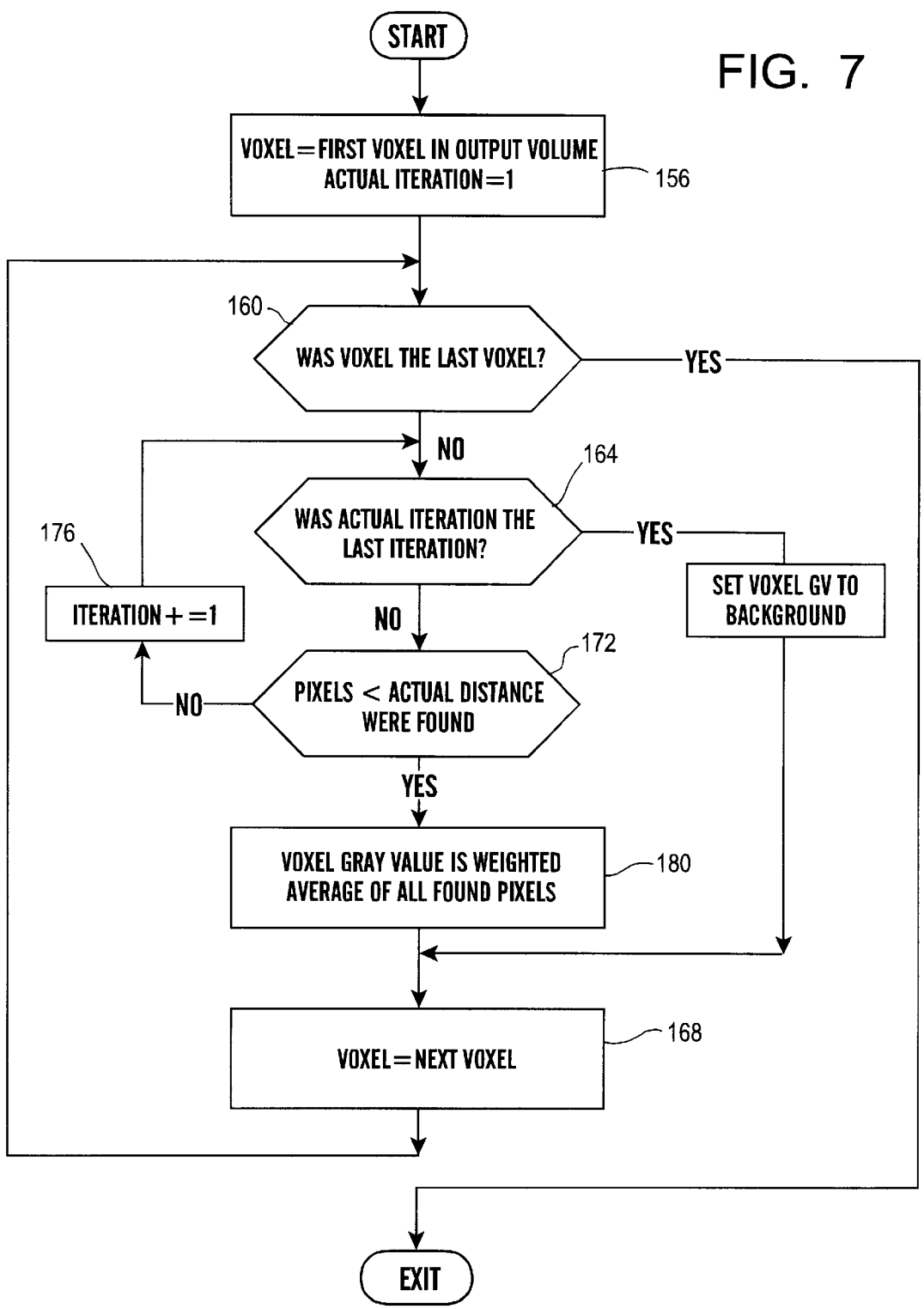

FIG. 7 depicts the weighted average algorithm. The gray scale value of the image element 94*a–m* is the linear distance-weighted average of all neighbored input pixels in the scanning planes 26*a–n'*. As noted above, if no neighbors are found in the actual iteration step, the process is repeated up to n times with MinDist=MinDist+DeltaDist. In action box 156, the image element 94*a* is set as the first image element in the output volume and the actual iteration is set at n=1. The central processor then continues to decision box 160 where the central processor determines if the image element 94*a* is the last image element in the output volume 98. If so, the central processor exits the algorithm. If not, the central processor continues to decision box 164 where it determines if the subject iteration is the last (i.e., whether the iteration is the nth iteration). If so, the central processor proceeds to action box 168 where it sets the image element's gray-scale value to the background value and continues to action box 160. If not, the central processor continues to decision box 172, where it identifies the pixels in the frame stack closer to the image element 94*a* than the radius "R" (i.e., MinDist). If no such pixels are identified, the iteration number is increased by 1 in action box 176 and the central processor returns to decision box 164. If a pixel is identified, the central processor continues to action box 180, where it determines the weighted average of the gray-scale values of all of the pixels identified as being within radius "R" of the image element 94*a* and assigns the weighted average gray-scale value as the gray-scale value of the image element. In action box 168, the central processor repeats the preceding steps for the next image element 94*b* in the output volume and so on until the steps are performed for image element 94*m*.

Following the completion of action box 90, the central processor in action box 200 saves the image reconstruction information in memory. In decision box 204, the central processor determines if further scanning or image information acquisition are required. If so, the central processor returns to action box 66. If not, the central processor exits the algorithm.

Figure 9A:
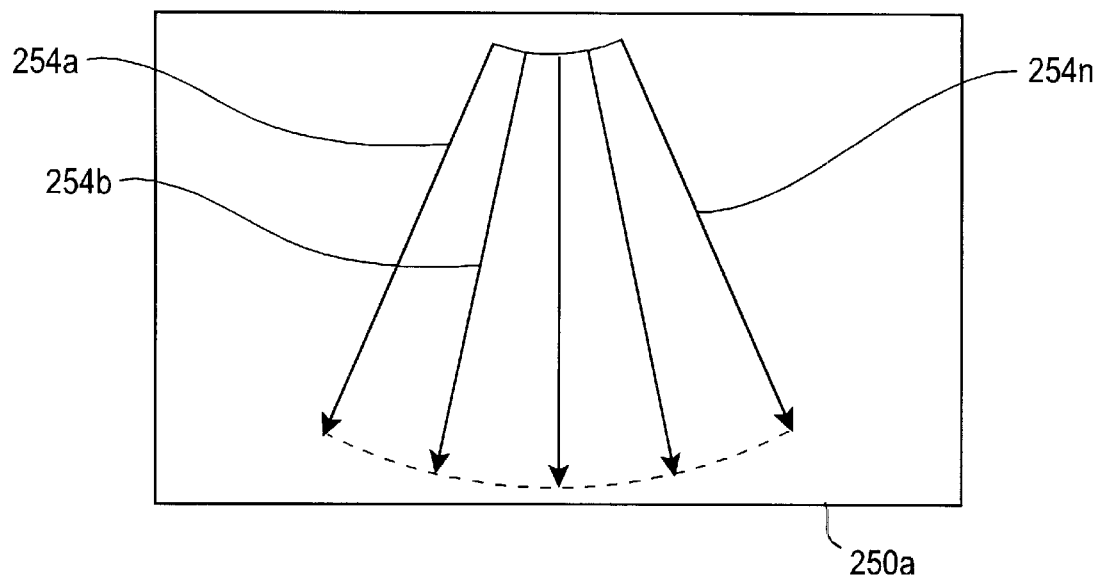
FIGS. 9A and B are depictions of a two-dimensional scanning plane for a sector scanner (FIG. 9A) and a linear scanner (FIG. 9B)
Figure 9B:
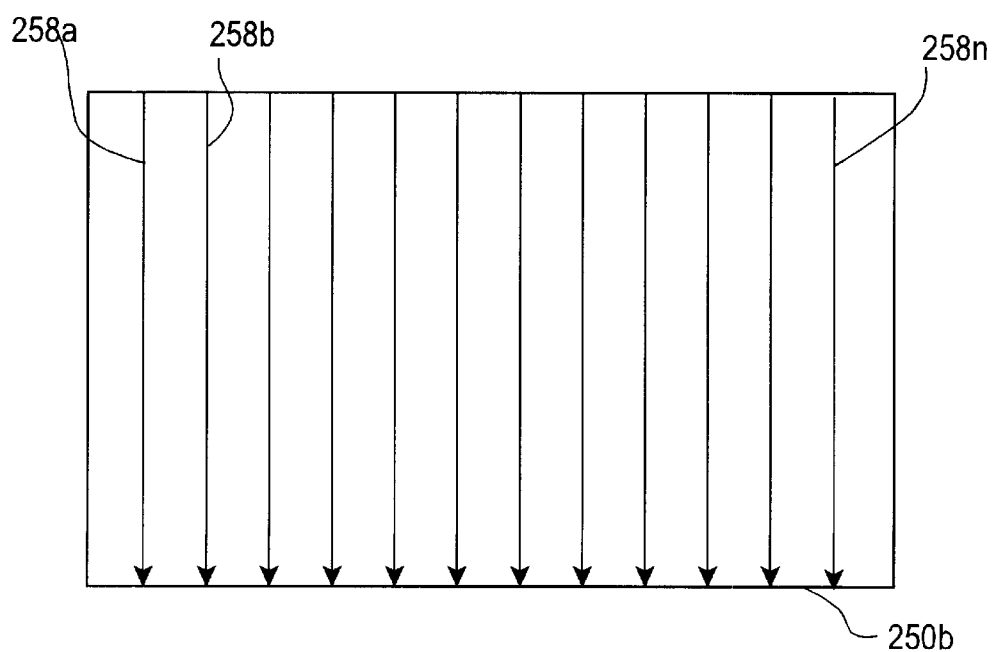

In an alternative embodiment, ultrasound beam data is used in action box 90 to perform image reconstruction instead of two-dimensional images formed from the beam data as noted in the embodiment above. By computing the spatial position of the ultrasound beam data in combination with the spatial information for the two-dimensional scan plane containing the ultrasound beam data, this embodiment can sort oblique scan planes to form three- and four-dimensional images. As will be appreciated, three- and four-dimensional image reconstruction commonly converts ultrasound beam data corresponding to a particular scanning plane into a single two-dimensional image. As shown in FIGS. 9A and B, each scanning plane 250*a,b* can contain a plurality of ultrasound beams 254, 258, with the number of beams per scanning plane typically being 64, 128, or 256. By knowing the position of the scan plane 250*a,b* in which the beam is generated, the number of the beam (i.e., 1. beam, 2. beam, etc.), and the type of probe (i.e., linear, curved linear, sector, etc.), the spatial position of each beam 254*a–n* or 258*a–n* can be determined. The location of the beam and its associated data is then used in action box 90 above to complete each of the image elements in the output volume.

Yet another embodiment is depicted in FIG. 10. In this embodiment, both spatial and temporal image information are employed in the reconstruction of three- and four-dimensional images using the techniques described above. A time stamp is stored with each element of ultrasound beam data or two dimensional image produced from the beam data. Each time stamp can represent a selected period of time, such as 16.5 milliseconds. Thus, two time stamps represent 33 milliseconds after a selected datum point and so on. Typically, one time stamp ranges from about 1 to about 100 milliseconds. When image acquisition is completed, spatial information can be used to transform the beam data or series of two dimensional images derived therefrom into a three dimensional image dataset while the time stamp information is used to transform the two dimensional images or beam data into a four dimensional data set.

Referring again to FIG. 10, the computer performs the steps noted above with the addition of action boxes 260, 264, 268 and 272. Action box 260 is substantially the same as action box 90 above. Thus, an output volume can be constructed that includes all of the image information corresponding to each of the time stamps. The output volume can be employed in later steps to form a plurality of output volumes corresponding to a plurality of different time stamps or points in the cardiac cycle.

Figure 17:
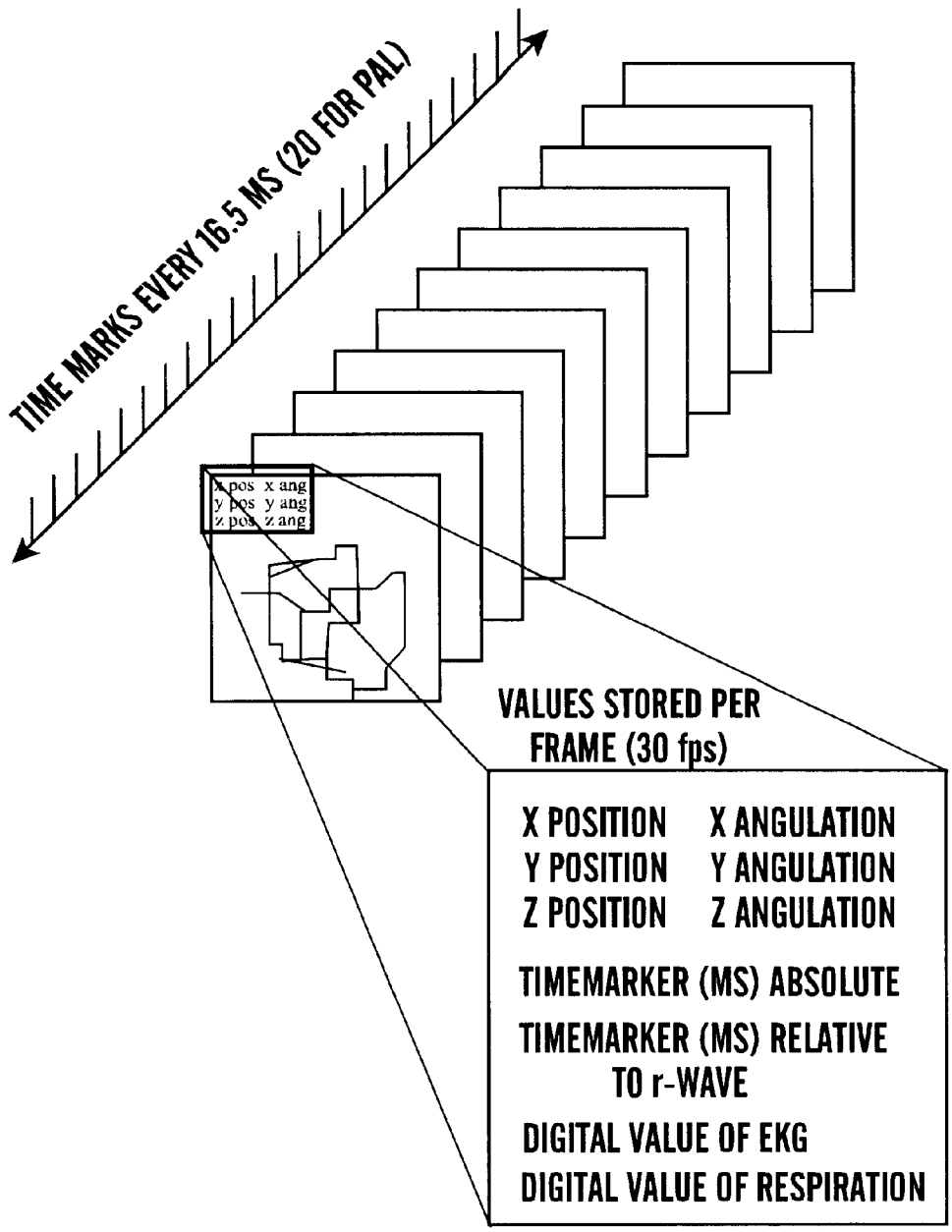
FIG. 17 depicts a plurality of two-dimensional images, each from an image scan, containing image information.

In action box 264, filtering is performed based on the temporal distribution of the image information relative to the movement of the heart or cardiac cycle. During image acquisition, the ECG signal is monitored using conventional techniques and pertinent analog values stored for each two dimensional image or item of beam data. Additionally, an absolute time stamp and/or time stamp relative to the r-wave are determined and stored with the image or beam data. This data is depicted in FIG. 17.

Figure 11:
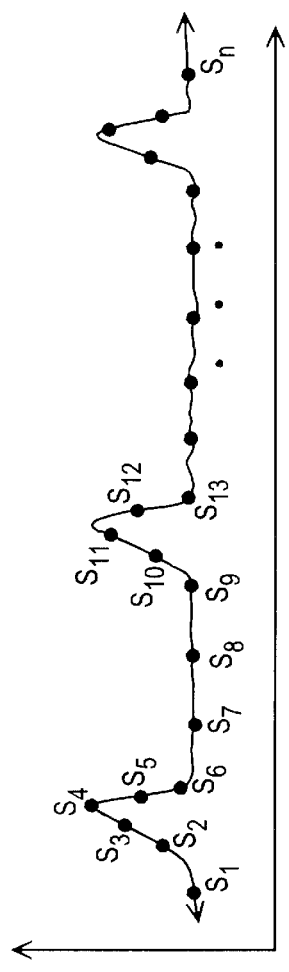
FIG. 11 depicts the ECG signal as a function of time.
Figure 12:
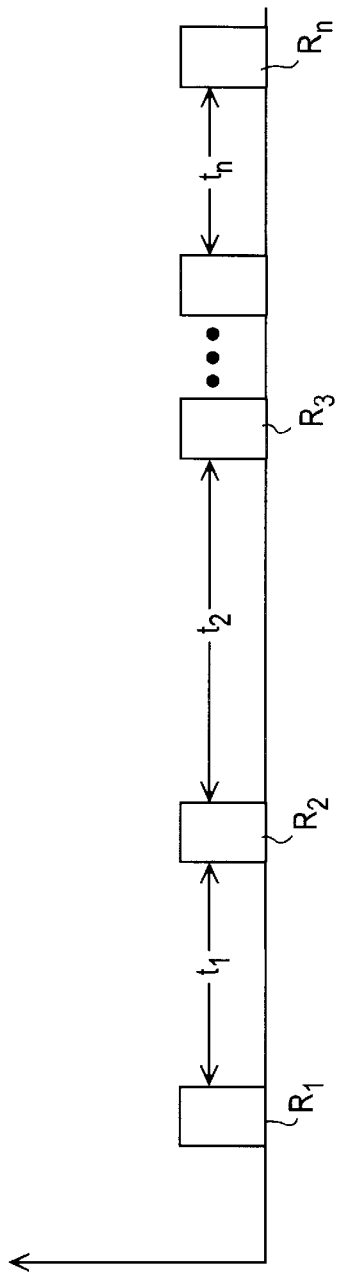
FIG. 12 depicts a plot of digital values translated from the ECG signal as a function of time.
Figure 13:
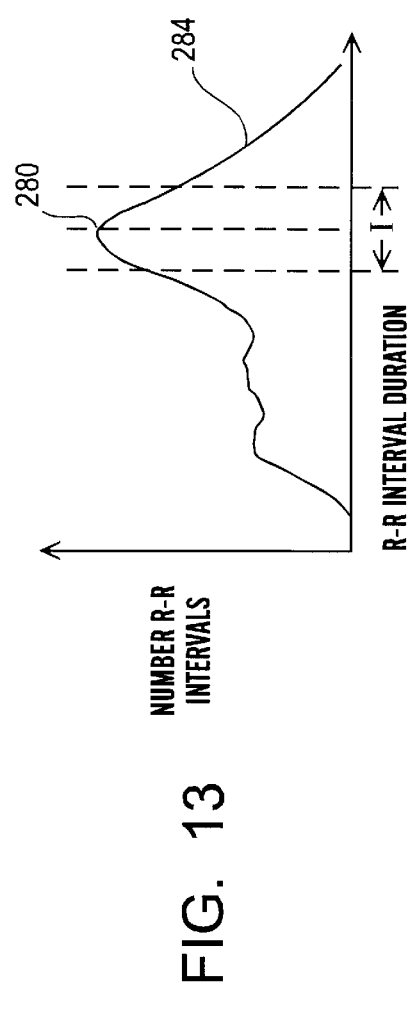
FIG. 13 depicts a plot of the r—r interval versus time.

In action box 264, the image information is filtered based on the length of the heart cycle (i.e., the interval between adjacent r-waves). As will be appreciated, the heart is not beating at a constant rate and therefore certain images acquired during some of the heart cycles may have to be rejected depending upon the length of the heart cycle. To perform the filtering step, suitable hardware and software, as known in the art, samples the analog ECG signal of the patient (see FIG. 11) at a number of points $S_1$ to $S_n$ and converts the magnitude of the signal at each point into a proportional digital value. Referring to FIG. 12, the digital values above a threshold level are converted into r-waves (i.e., contractions of the heart muscles) $R_1$ to $R_n$ while the digital values below the threshold level are assumed to correspond to relaxation of the heart muscles (i.e., the interval between adjacent r-waves). The time intervals $t_1$ to $t_n$ between adjacent r-waves $R_1$ to $R_n$ are determined and a histogram of the type depicted in FIG. 13 is plotted. The apex 280 of the resulting curve 284 is assumed to correspond to a perfect R—R interval. An interval "I" is selected having the apex 280 of the curve as its center. The width of interval "I" is selected based on suitable criteria known in the art. Only image information falling within the selected interval "I" is used in later reconstruction steps. Image information falling outside of the interval is rejected as being anomalous.

Figure 14:
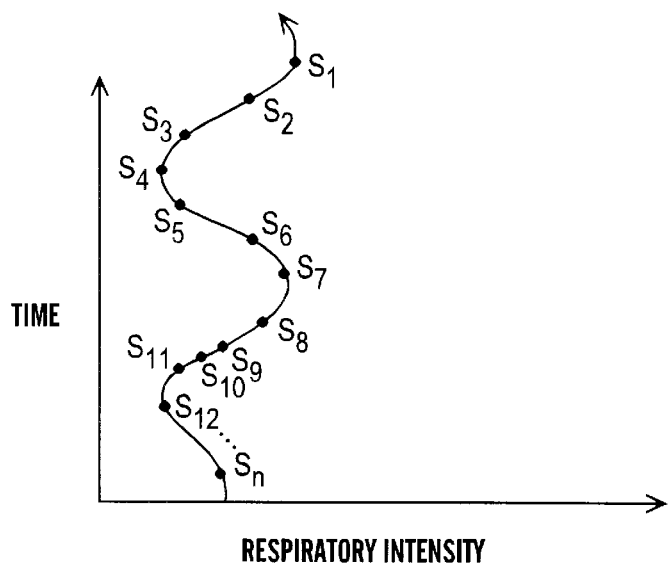
FIG. 14 depicts respiration intensity as a function of time.
Figure 15:
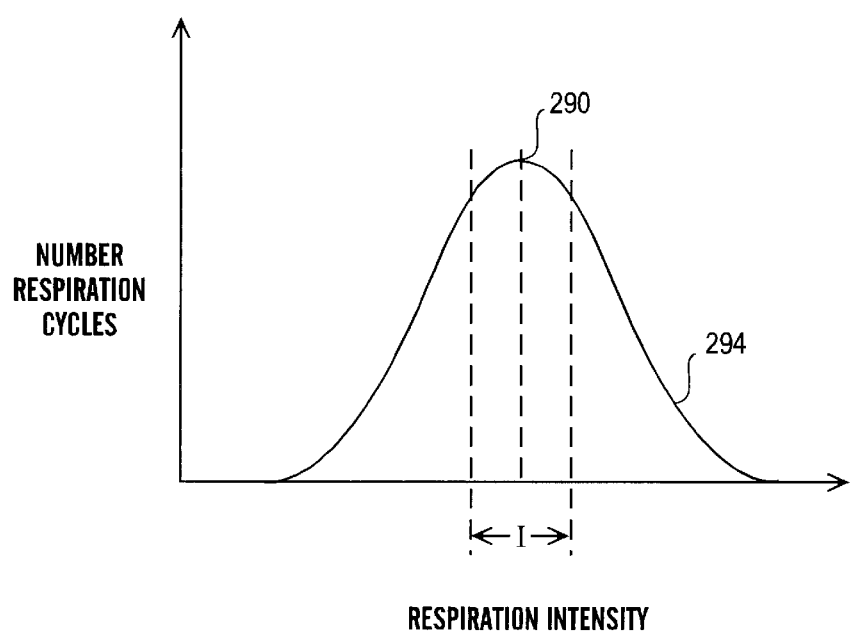
FIG. 15 is a histogram based on the digital respiration values.

In action box 268, the image information is filtered based on the patient's respiration phase. As will be appreciated, because the heart is moving during respiration, certain images, depending upon the respiration phase, may have to be rejected to enhance image quality. To perform this filtering step, a patient's respiration is monitored using suitable equipment during image acquisition. To perform the filtering step, suitable hardware and software, as known in the art, samples the analog respiration signal of the patient (see FIG. 14) at a number of points $S_1$ to $S_n$ and converts the magnitude of the signal at each point into a proportional digital value. The digital values are used to prepare a histogram of the type depicted in FIG. 15. The apex 290 of the resulting curve 294 is assumed to correspond to a perfect respiration phase relative to the R—R interval. An interval "I" is selected having the apex 290 of the curve 294 as its center. The width of interval "I" is selected based on suitable criteria known in the art. Only image information falling within the selected interval "I" is used in later reconstruction steps. Image information falling outside of the interval is rejected as being anomalous.

Figure 16:
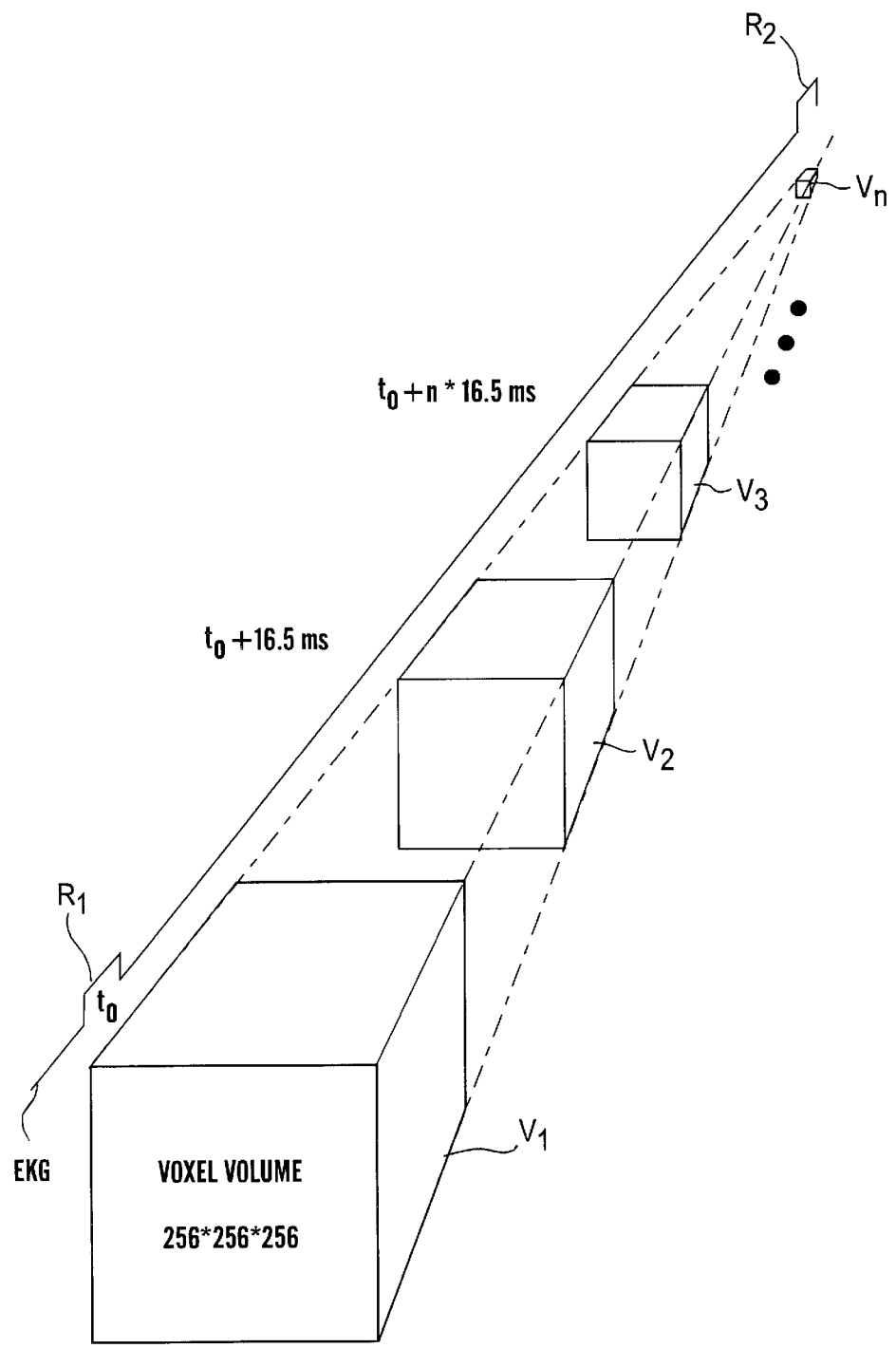
FIG. 16 depicts the various output volumes $V_1$ to $V_n$ in a representative r—r interval.

After the filtering step, the various image elements in the output volume can be sorted based upon time stamp to provide images of the heart at selected points during a cardiac cycle or at the selected points during a number of cardiac cycles. This is depicted in FIG. 16 for a plurality of output volumes $V_1$ to $V_n$ for a representative cardiac cycle formed by R-waves $R_1$ and $R_2$. In the former case, the time stamp relative to the r-wave is employed such that an output volume corresponds to each time stamp in a representative r—r interval. Stated another way, each time stamp includes image information from a number of different ultrasound scans taken at different times. In the latter case, the absolute time stamp is used such that an output volume corresponds to each absolute time stamp over a number of r—r intervals.

While various embodiments of the present invention have been described in detail, it is apparent that modifications and adaptations of those embodiments will occur to those skilled in the art. It is to be expressly understood that such modifications and adaptations are within the spirit and scope of the present invention.

What is claimed is:

1. A method for constructing a three- or four-dimensional image describing an object, comprising:
    (a) passing ultrasonic energy through at least a portion of an object and thereby generating image information describing the object, the image information corresponding to a plurality of ultrasonic regions having a predetermined geometric configuration;
    (b) determining an ordering for a plurality of image elements of a three- or four-dimensional output volume, wherein each of said image elements has a predetermined size;
    (c) determining the image information in at least one of the plurality of ultrasonic regions that is within a predetermined proximity of or within a first image element of the three- or four-dimensional output volume to define a first subset of image information corresponding to the first image element, wherein the output volume includes a plurality of image elements;
    (d) assigning, based on one or more of the items in the first subset of image information, a gray scale value to the first image element; and
    (e) repeating, in accordance with the ordering of step (b), steps (c) and (d) for each of the other image elements in the output volume to construct the three- or four-dimensional image of the object.

2. The method of claim 1, wherein the generating step comprises:
    passing an ultrasound probe over the object, wherein the position of the ultrasound Probe is determined by a position sensor attached to the ultrasound probe and the plurality of ultrasonic regions correspond to a plurality of intersecting image planes.

3. The method of claim 2, wherein each of the plurality of image planes includes a plurality of pixels and each pixel has at least one of a height and width and wherein a dimension of the image elements in the output volume is a function of the at least one of a height and width.

4. The method of claim 1, wherein the first image element is one of a voxel or toxel and, in the determining step (c), image information in each of the plurality of ultrasonic regions is considered in defining the first subset of image information.

5. The method of claim 1, wherein the assigning step comprises the substep of:
    filtering the first subset of image information to define a second set of image information that is derived from the first subset of image information, wherein the second subset of image information is different from the first subset of image information.

6. The method of claim 5, wherein in the filtering substep the gray scale value is assigned to the first image element of the output volume, the gray scale value being related to a plurality of gray scale values in the first subset of image information.

7. The method of claim 1, wherein the assigning step is performed using at least one of a first found algorithm, a closest distance algorithm, a weighted average algorithm, and a last found algorithm.

8. The method of claim 1, wherein the plurality of ultrasonic regions correspond to a plurality of ultrasound beams and the image information includes one or more of the number of each of the plurality of ultrasound beams, the type of probe, and the spatial position of each ultrasound beam.

9. The method of claim 1, wherein the image information includes at least one time stamp.

10. The method of claim 1, further comprising the step of:
    filtering the image information based on the temporal distribution of image information relative to the cardiac cycle of a patient.

11. The method of claim 1, further comprising the steps of:
    monitoring an ECG signal during the passing step to generate a plurality of cardiac signals;
    converting the cardiac signals into digital values;
    comparing each of the digital values to a threshold level to identify contraction of heart muscles and relaxation of heart muscles;
    determining the time intervals between contraction of the heart muscles;
    based on the step of determining the time intervals, selecting a time interval; and
    rejecting image information falling outside of the time interval.

12. The method of claim 1, further comprising the step of:
    filtering the image information based on the temporal distribution of the image information relative to the respiratory cycle of a patient.

13. The method of claim 1, further comprising the steps of:
    monitoring the respiration phase of a patient during the passing step to generate a plurality of respiratory signals;
    converting the respiratory signals into digital values;
    comparing each of the digital values to a threshold level to identify contraction of diaphragm muscles and relaxation of diaphragm muscles;
    determining the time intervals between contraction of the diaphragm muscles;
    based on the step of determining the time intervals, selecting a time interval; and
    rejecting image information falling outside of the time interval.

14. The method of claim 1, further comprising before step (c), selecting an algorithm for the assigning step that is at least one of the following: first found algorithm, closest distance algorithm, weighted average algorithm, and last found algorithm.

15. A system for constructing a three- or four-dimensional image describing an object, comprising:
    an emitter for passing ultrasonic energy through at least a portion of an object and a receiver for receiving reflected ultrasonic energy to form image information describing the object and corresponding to a plurality of ultrasonic regions having a predetermined geometric configuration,
    means for determining an ordering for a plurality of image elements of a three- or four-dimensional output volume, wherein each of said image elements has a predetermined size;
    means for determining the image information in at least one of the plurality of ultrasonic regions that is within a predetermined proximity of or within a first image element to define a first subset of image information corresponding to the first image element; and
    means for analyzing one or more of the items in the first subset of image information to assign a gray scale value to the first image element.

16. The system of claim 15, wherein a position sensor receiver is attached to the emitter, the position sensor receiver determining the position of the emitter in space.

17. The system of claim 15, wherein each ultrasonic region includes a plurality of pixels and each pixel has at least one of a height and width and wherein a dimension of the first image element of the output volume is a function of the at least one of a height and width.

18. The system of claim 15, wherein the image information includes location coordinates relative to a reference axis and the output volume is defined by the reference axis and the determining means comprises means for identifying the image information that is located within the predetermined proximity of or within each image element to define each of the subsets of image information corresponding to each of the plurality of image elements.

19. The system of claim 15, wherein the means for analyzing includes:
    means for processing the first subset of image information to define a second set of image information that is derived from the first subset of image information, wherein the second subset of image information is different from the first subset of image information.

20. The method of claim 19, wherein the image information is contained in a plurality of predetermined regions and, in substep (ii), each of the plurality of predetermined regions is considered in determining a gray scale value for each of the subvolumes.

21. The system of claim 19 wherein the processing means assigns the gray scale value to the first image element, the gray scale value being related to a plurality of gray scale values in the first subset of image information.

22. A method for constructing a three- or four-dimensional image describing an object, comprising:
    (a) passing an ultrasound probe over an object to generate image information describing a characteristic of an object,
    (b) determining an ordering for a plurality of subvolumes of an output volume, wherein each of said subvolumes has a predetermined size;
    (c) performing for each subvolume, in a manner related to the predetermined ordering, one or more of the following steps:
        (i) selecting a predetermined region of image information having a predetermined geometric configuration; and
        (ii) determining a gray scale value for said subvolume according to the image information in the predetermined region that are located within a predetermined proximity of or within said subvolume.

23. The method of claim 22, wherein the image information is located outside of the subvolume and within the predetermined proximity of the subvolume to define a three- or four-dimensional representation of the object.

24. A method for constructing a three- or four-dimensional image describing tissue of a patient, comprising:
   (a) generating image information describing the tissue and corresponding to a plurality of image planes, wherein the image information comprises a plurality of items of image information,
   (b) monitoring at least one of the cardiac and respiratory cycles of the patient;
   (c) assigning a time stamp to each of the plurality of items of image information;
   (d) providing a set of temporal signals from the monitoring step;
   (e) generating from the image information and the corresponding time stamps at least one output volume, the at least one output volume including a plurality of image elements;
   (f) thereafter filtering the image information based on the relationship of the time stamps corresponding to the image information to one or more selected temporal signals; and
   (g) thereafter viewing an image of the tissue based on the selected image information.

25. The method of claim 24, wherein the tissue is heart tissue and the generating step comprises sorting through the plurality of items of image information based on the time stamp to provide an image of the heart tissue during a selected part of the cardiac cycle.

26. A system for constructing a three- or four-dimensional image describing an object, comprising:
   an emitter for passing ultrasonic energy through at least a portion of an object;
   a receiver, in communication with the emitter, for receiving reflected ultrasonic energy to form image information describing the object and corresponding to a plurality of predetermined regions, each predetermined region of image information having a predetermined geometric configuration;
   a first computational component, in communication with the receiver, for determining an ordering for a plurality of subvolumes of an output volume, wherein each of the subvolumes has a predetermined size;
   a second computational component, in communication with the first computational component, for selecting for each subvolume, in a manner related to the predetermined ordering, one or more of the predetermined regions of image information; and
   a third computational component, in communication with the second computational component, for determining for each subvolume, in a manner related to the predetermined ordering, a gray scale value according to the image information in the predetermined region that is within a predetermined proximity of or within the subvolume.

27. The system of claim 26, wherein a position sensor receiver is attached to the emitter, the position sensor receiver determining a position of the emitter in space, and the plurality of predetermined regions correspond to a plurality of intersecting image planes.

28. The system of claim 27, wherein each image plane includes a plurality of pixels and each pixel has at least one of a height and width and wherein a dimension of the image elements in the output volume is a function of the at least one of a height and width.

29. The system of claim 26, further comprising:
   a fourth computational component, in communication with at least one of the receiver, emitter, and first computational component, for assigning one or more time stamps to the image information;
   a fifth computational component, in communication with at least one of the receiver, emitter, first computational component, and second computational component, for monitoring at least one of the cardiac and respiratory cycles of a patient; and
   a sixth computational component, in communication with the fifth computational component, for providing a set of temporal signals.

30. The system of claim 26, further comprising:
   a fourth computational component, in communication with the third computational component, for selecting an algorithm, from among a number of possible algorithms, that is at least one of the following: first found algorithm, closest distance algorithm, weighted average algorithm, and last found algorithm.

* * * * *